(12) United States Patent
Klezath

(10) Patent No.: US 6,575,412 B2
(45) Date of Patent: Jun. 10, 2003

(54) SUPPORT FOR PIPELINES AND PROCESS FOR MOUNTING SUCH A SUPPORT

(75) Inventor: Hermann Klezath, Bremen (DE)

(73) Assignee: Kaefer Isoliertechnik GmbH & Co. KG (DE)

( * ) Notice: Subject to any disclaimer, the term of this patent is extended or adjusted under 35 U.S.C. 154(b) by 0 days.

(21) Appl. No.: 09/950,305

(22) Filed: Sep. 10, 2001

(65) Prior Publication Data

US 2002/0060274 A1 May 23, 2002

(30) Foreign Application Priority Data

Sep. 11, 2000 (DE) .......................... 100 45 010

(51) Int. Cl.⁷ ................................................. F16L 3/00
(52) U.S. Cl. ........................................ 248/58; 248/65
(58) Field of Search ................. 248/58, 65, 226.12, 248/230.3, 49, 214

(56) References Cited

U.S. PATENT DOCUMENTS

| | | | | |
|---|---|---|---|---|
| 448,359 A | * | 3/1891 | Nichols ................... 248/74.1 |
| 773,710 A | * | 11/1904 | Bronson ................... 248/74.1 |
| 2,290,139 A | * | 7/1942 | Buchanan ................... 248/58 |
| 4,140,292 A | * | 2/1979 | Kaigler, Jr. ................... 248/49 |
| 4,530,478 A | * | 7/1985 | McClellan ................... 248/62 |
| 4,714,229 A | * | 12/1987 | Force et al. ................... 248/610 |
| 4,714,986 A | * | 12/1987 | Wurster ................... 362/267 |
| 4,804,158 A | * | 2/1989 | Collins et al. ............. 248/74.4 |
| 4,858,861 A | * | 8/1989 | Wilkinson, III ............ 248/74.1 |
| 5,066,053 A | * | 11/1991 | Miller ................... 285/373 |
| 5,261,633 A | * | 11/1993 | Mastro ................... 248/74.1 |
| 5,329,657 A | * | 7/1994 | Bartley et al. ................. 5/617 |
| 5,435,506 A | * | 7/1995 | Wiley ................... 248/74.1 |
| 5,984,243 A | * | 11/1999 | Pfaller et al. ............. 248/74.1 |
| 6,031,972 A | * | 2/2000 | Barker ................... 392/478 |
| 6,135,398 A | * | 10/2000 | Quesnel ................... 248/74.1 |
| 6,199,595 B1 | * | 3/2001 | Baker ................... 138/149 |

FOREIGN PATENT DOCUMENTS

| | | |
|---|---|---|
| DE | 1 984 394 | 4/1968 |
| DE | 2 053 949 | 12/1971 |
| DE | 299 13 157 U1 | 12/1999 |

OTHER PUBLICATIONS

Lisega, Rohrschellen, Rohlager '94, no translation.

\* cited by examiner

*Primary Examiner*—Leslie A. Braun
*Assistant Examiner*—A. Joseph Wujciak
(74) *Attorney, Agent, or Firm*—McGlew and Tuttle, P.C.

(57) ABSTRACT

A support for a pipeline, especially for cold liquids, has a two-part or more than two-part carriage, which surrounds an insulating shell surrounding the pipeline. The carriage includes carriage parts connected to one another at connection flanges. One of the connection flanges is arranged under the pipeline when viewed from a base plate on which the pipeline is supported vertically toward the central axis of the pipeline.

19 Claims, 11 Drawing Sheets

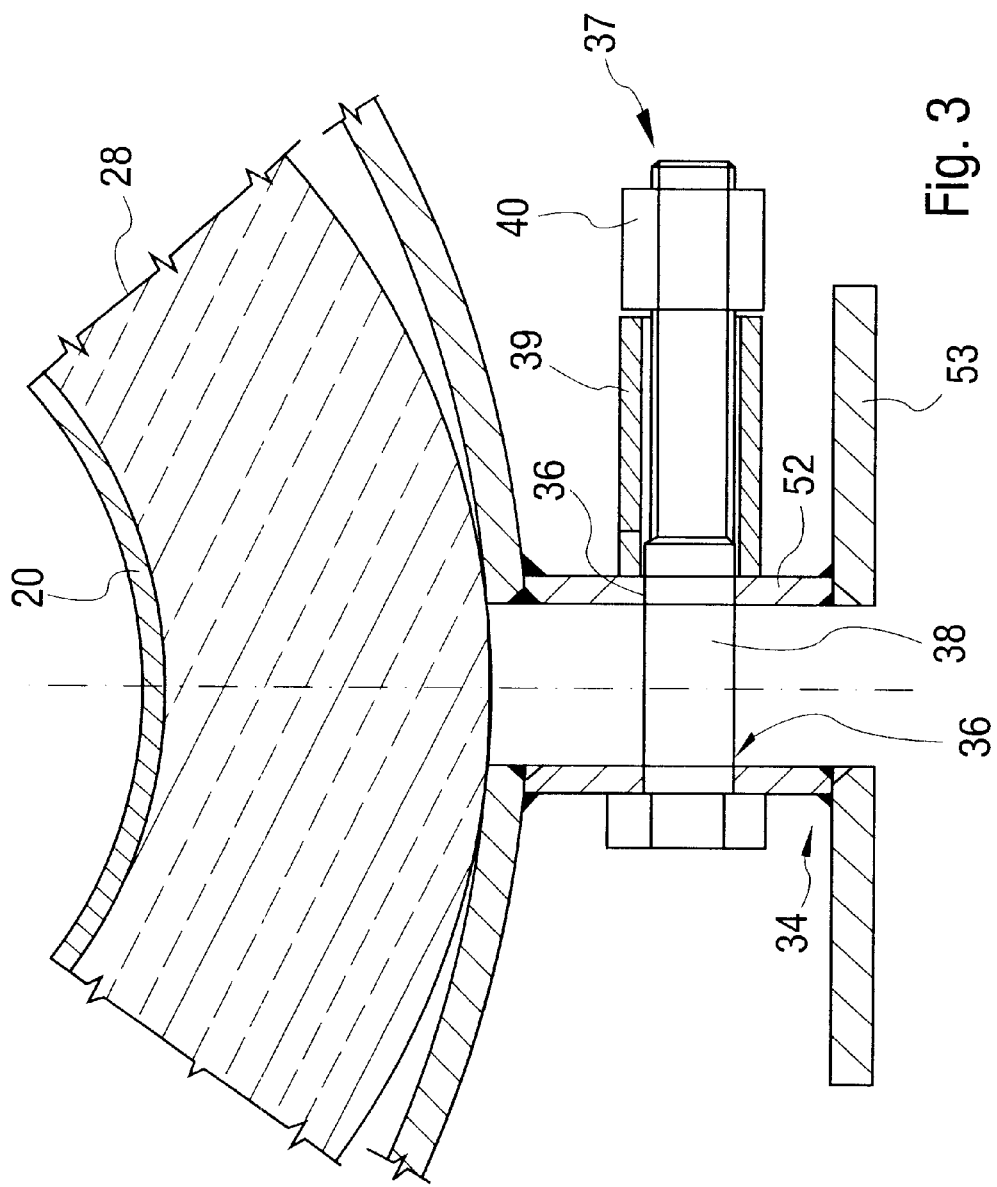

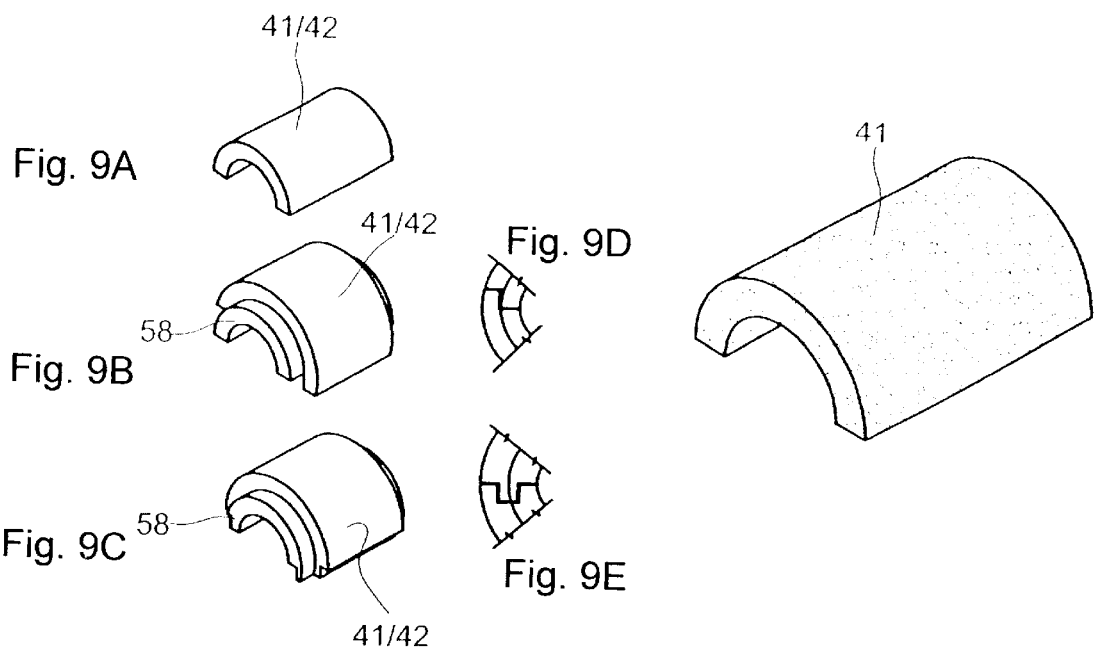
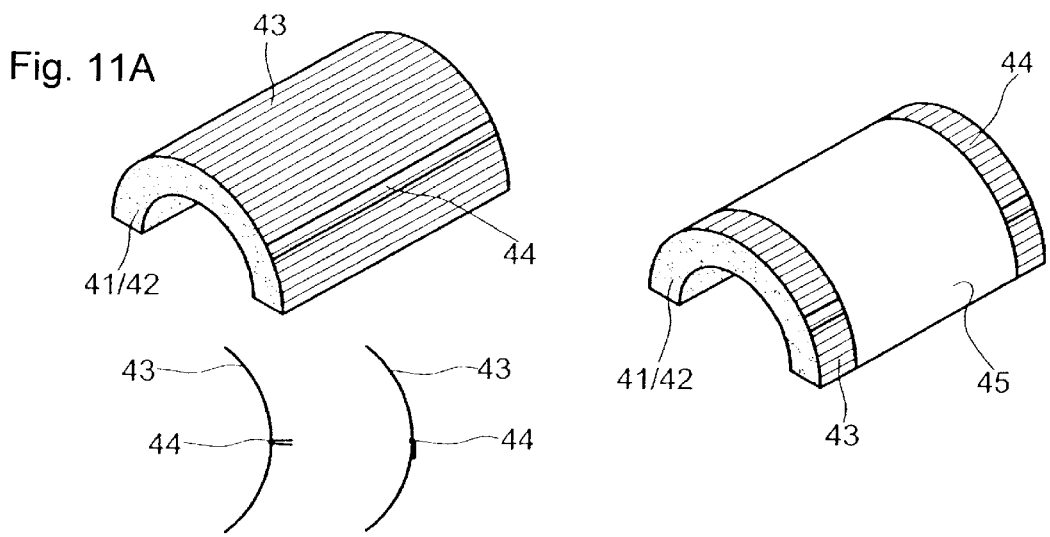

SUPPORT FOR PIPELINES AND PROCESS FOR MOUNTING SUCH A SUPPORT

FIELD OF THE INVENTION

The present invention pertains to a support for pipelines for cold liquids with a two-part or more than two-part carriage, which surrounds an insulating shell surrounding the pipeline, wherein the carriage comprises carriage parts connected to one another at connection flanges. Furthermore, the present invention pertains to a process for mounting or supporting such a support.

BACKGROUND OF THE INVENTION

Such a support is shown, e.g., in Arbeitsblatt Q 03 of the Arbeitsgemeinschaft Industriebau e.V. (AGI) and will be briefly explained below on the basis of FIG. 15. The carriage 61, also called steel shoe, has a two-part design. One carriage part has a foot 62, on which a semicircular shell 63 is arranged. This semicircular shell 63, installed via the insulation, is bolted at connection points to a second, semicircular shell 64, which forms the second carriage part. A lower carriage part and an upper carriage part are thus obtained, which are bolted to one another in a plane extending obliquely to the vertical. As a result, the pipeline is in close contact in the lower shell part and is already fixed properly.

Pipelines for cold liquids, which are defined, in general, as liquids with a temperature below 11° C., are provided with an insulation, which comprises an insulation layer directly surrounding the pipeline and an outer vapor barrier. The outer vapor barrier is occasionally damaged in practice, so that moisture penetrates into the insulation layer. This layer is to be replaced in this case. The carriage must also be removed from the pipeline for this purpose. The carriage itself is also subject to corrosive attacks and is therefore to be removed from time to time. Finally, it is also necessary to occasionally inspect the pipeline itself for cracks or corrosion on the pipeline, especially at the weld seams, for which purpose the insulation and along with it the carriage are again to be removed. According to the state of the art, the pipeline must be raised for this purpose in order to lift it out of the lower shell part, or the lower carriage part and the insulation must be completely destroyed. Raising of the pipeline cannot be considered in the case of pipelines for very cold liquids, which have a temperature of −164° C. in the case of, e.g., liquefied natural gas (methane), because of the cold embrittlement of the steel pipe which occurs at these low temperatures. Thus, the pipeline must be put out of operation during the maintenance and inspection procedures, which is associated with considerable costs due to downtime. During the reinstallation of the prior-art carriages, the pipeline, already provided with new insulating shells according to the state of the art, is to be raised again in order to place it into the lower carriage part. As was said, this cannot be done during the running operation of the pipeline.

Another type of pipe support is used in pipelines with small pipe diameter for cold liquids. These pipe supports, which are also called pipe clamps, are shown, e.g., in the 1994 LISEGA Katalog Rohrschellen Rohrlager [1994 LISEGA Pipe Clamps and Pipe Supports Catalog-Tr.Ed.]. These pipe supports comprise two carriage parts, which are connected to one another at connection flanges and between which the pipeline is braced directly by means of bolts without the interposition of an insulation. One of the connection flanges is arranged, when viewed from a base plate on which the pipeline is supported vertically toward the central axis of the pipeline, exactly under the pipeline. The pipe clamps form a heat bridge here, because they are clamped on the pipelines directly without the interposition of an insulation. These pipe clamps have been known for a long time. However, they are not suitable for use as supports of the type mentioned in the introduction.

Furthermore, carriages for supporting pipelines, which comprise a plurality of carriage parts, have been known from DE-GM 1 984 394, DE 299 13 157 U1, DE-AS 2 053 949 and U.S. Pat. No. 4,858,861, where the carriage parts can be connected to one another with a connection flange, which is arranged exactly under the pipeline. These carriages correspond in this respect to the pipe supports shown in the 1994 LISEGA Katalog Rohrschellen Rohrlager.

SUMMARY AND OBJECTS OF THE INVENTION

Based on this, the basic object of the present invention is to improve a support of the type mentioned in the introduction such that it can be removed and supported in a simplified manner even during the running operation of the pipeline. Furthermore, another basic object of the present invention is to provide a process for supporting or mounting such supports.

To accomplish this object, the support according to the present invention is characterized in that when viewed from a base plate on which the pipeline is supported vertically to the central axis of the pipeline, one of the connection flanges is arranged exactly under the pipeline and that the carriage parts have guides for receiving guide tools for supporting the carriage.

The process according to the present invention is characterized in that the carriage parts are offset laterally next to the pipelines and are then moved to the pipeline by means of guide tools and are finally connected to one another.

Carrying out the process according to the present invention becomes possible only due to the construction of the support according to the present invention. The carriage parts can be brought to the pipeline laterally, i.e., in the plane of the base plate and connected, specifically bolted to one another here. Any change in the position of the central axis of the pipeline, especially the raising of the pipeline, are avoided as a result. The carriage can thus be supported and removed during running operation even in the case of pipelines carrying very cold liquids. The supports according to the present invention can also be supported with the process according to the present invention even in the case of pipelines adjoining one another at closely spaced locations one behind another in a plurality of rows. Moreover, it is guaranteed by the guide tools that jamming of the carriage parts during supporting and consequently damage to the vapor barrier of the insulation during supporting are avoided.

In a variant, guide holes, especially separate ones, are provided as guides in the connection flanges. For example, bolts can be used as guide tools in this simple design. In this case, the guide holes should be guided on the barrel of the bolt rather than on the thread. The desired guiding properties can thus be easily achieved by a suitable coordination of the fit between the guide hole and the barrel of the bolt.

It is recommended that a temporary support be provided for the pipeline during the supporting and removal of the support according to the present invention. This temporary support comprises, according to a specific exemplary embodiment, a gallows supported above the pipeline, which has a loop each to the left and right of the support for temporarily receiving the pipeline.

The present invention will be explained in greater detail below on the basis of exemplary embodiments shown in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a detail view of the partially supported support according to FIG. 1 in a section in plane A—A;

FIG. 9A is a perspective view showing one of three exemplary embodiments of an insulating shell for the support;

FIG. 9B is a perspective view showing a second of three exemplary embodiments of an insulating shell for the support;

FIG. 9C is a perspective view showing a third of three exemplary embodiments of an insulating shell for the support;

FIG. 9D is a schematic view showing the connection of the insulating shells for the embodiment of FIG. 9B;

FIG. 9E is a schematic view showing the connection of the insulating shells for the embodiment of FIG. 9B;

FIG. 10 is a in a perspective view showing one of the exemplary embodiments according to FIG. 9 for an insulating shell for the support according to the present invention;

FIG. 11A is a perspective view of the insulating shell according to FIG. 10 with the vapor barrier;

FIG. 11B is a side sectional schematic view of the vapor barrier in a position during assembly;

FIG. 11C is a side sectional schematic view of the vapor barrier in a position after assembly;

FIG. 12 is a perspective view of the insulating shell according to FIG. 10 with vapor barrier and cover plate;

DESCRIPTION OF THE PREFERRED EMBODIMENTS

Figure 1:
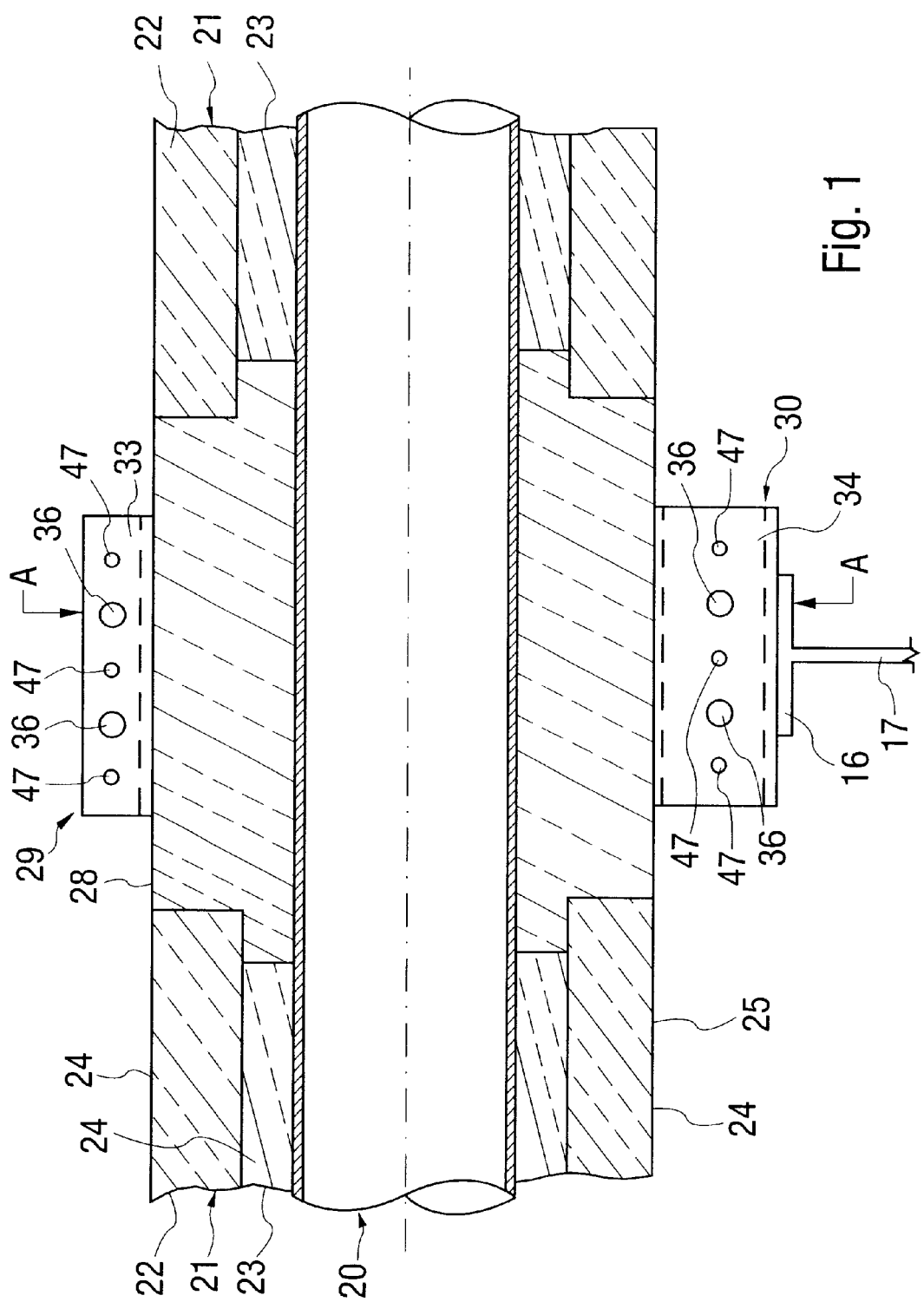
FIG. 1 is a vertical section in plane B—B according to FIG. 2 showing a support with the features of the present invention.

Referring to the drawings in particular, the present invention pertains specifically to the supporting of pipelines 20, especially those of large diameter, for cold liquids. Cold liquids are defined here as all liquids with a temperature below 11° C. The present invention also includes, in particular, pipelines 20 for very cold liquids, e.g., liquefied natural gas (liquid natural gas, LNG), liquefied methane or liquefied ethane, which have temperatures of about −164° C. (liquefied natural gas) to −104 C. (liquefied ethane). It can also be used for pipelines for liquid nitrogen. The pipelines 20 are provided with an insulation 21, which is formed by two insulation layers 22 and 23 in the exemplary embodiment according to FIG. 1. The outer insulation layer 22 and the inner insulation layer 23 are additionally provided with a vapor barrier 24, which prevents the penetration of moisture into the insulation. Moisture in the insulation impairs the insulating effect and leads to corrosion on the pipeline 20. A protective jacket 25 consisting of, e.g., steel plate, is also frequently provided on the vapor barrier 24 on the outside.

The pipelines are supported at regularly spaced locations on a base plate 26, mostly on the top side of a carrier 27 carrying a plurality of pipelines 20 arranged one after another or next to one another. The supports according to the present invention are used for this purpose: The supports have an insulating shell 28 made of hard insulating material, which surrounds the pipeline 20 and is arranged between the adjoining insulation 21. The insulating shells 28 are hard enough to carry the pipeline 20 together with the insulation 21 surrounding it. Each insulating shell 28 is surrounded by a carriage 29 in a ring-like manner. The carriage 29 has a foot 30, with which it is supported on the base plate 26.

The carriage 29 has a two-part design. It comprises two carriage parts 31, 32. The plane of division of the carriage 29, in which the connection points of the carriage parts 31, 32 are located, is arranged at right angles to the carrier 27. The carriage thus has two symmetrical carriage parts 31, 32, which may even have an identical design. Thus, only one type of carriage part needs to be provided for each pipe diameter or insulation diameter. The carriage parts 31, 32 are of identical design and are arranged mirror-inverted to one another. Furthermore, the carriage parts 31, 32 are of a half shell design and surround together the pipeline 20 and the insulating shell 28 in a circular manner. The carriage parts 31, 32 are connected, namely, bolted to one another at the upper connection flanges 33 and the lower connection flanges 34. A plane of division 35, which is arranged exactly vertically in this case (plane B—B according to FIGS. 2 and 5), is defined by the connection flanges 33, 34. This extension is recommended in the case of a base plate 26 arranged horizontally, as in the case of the exemplary embodiments being shown. Quite generally, the plane of division 35 should always be arranged at right angles to the plane of the base plate 26. As a result, the lower connection flanges 34 are always arranged under the pipeline when viewing in the direction of the base plate 26. In other words, the connection flanges 34 are located in the area of the shortest distance between the pipeline 20 or the insulation shell 28 and the base plate 26.

The upper connection flanges 33 and the lower connection flanges 34 have guides, which are guide holes 36 in the exemplary embodiment being shown. A guide tool 37 is inserted into the guide holes 36. This tool 37 has a bolt 38 in this case, whose barrel is inserted into the guide holes 36. The thread of the bolt 38 can be screwed to a nut 40 with the interposition of a spacer sleeve 39. The spacer sleeve 39 is used to ensure that the guide holes 36 are guided on the barrel of the bolt 38 rather than on the thread of the bolt. As is apparent from FIGS. 1, 4 and 6, two guide holes 36 are associated with each connection flange 33, 34, so that four guide tools 37 are also provided.

Figure 4A:
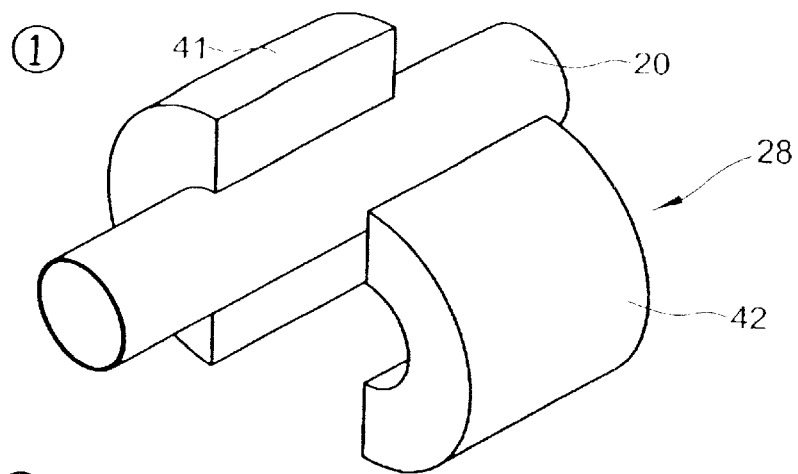
FIG. 4A is a schematic perspective view showing a step ① of a process for supporting the support according to FIG. 1.
Figure 4B:
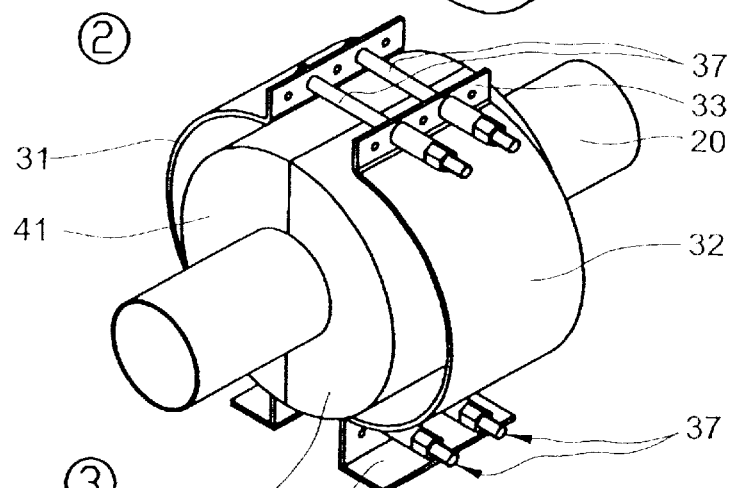
FIG. 4B is a schematic perspective view showing a step ② of a process for supporting the support according to FIG. 1.
Figure 4C:
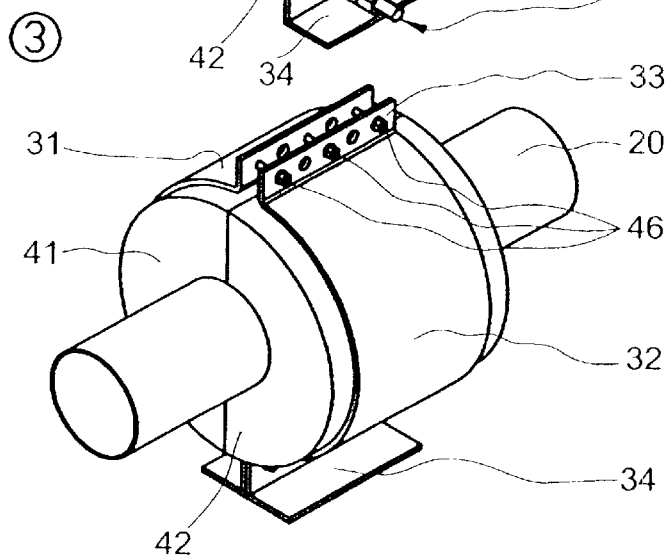
FIG. 4C is a schematic perspective view showing a step ③ of a process for supporting the support according to FIG. 1.
Figure 6:
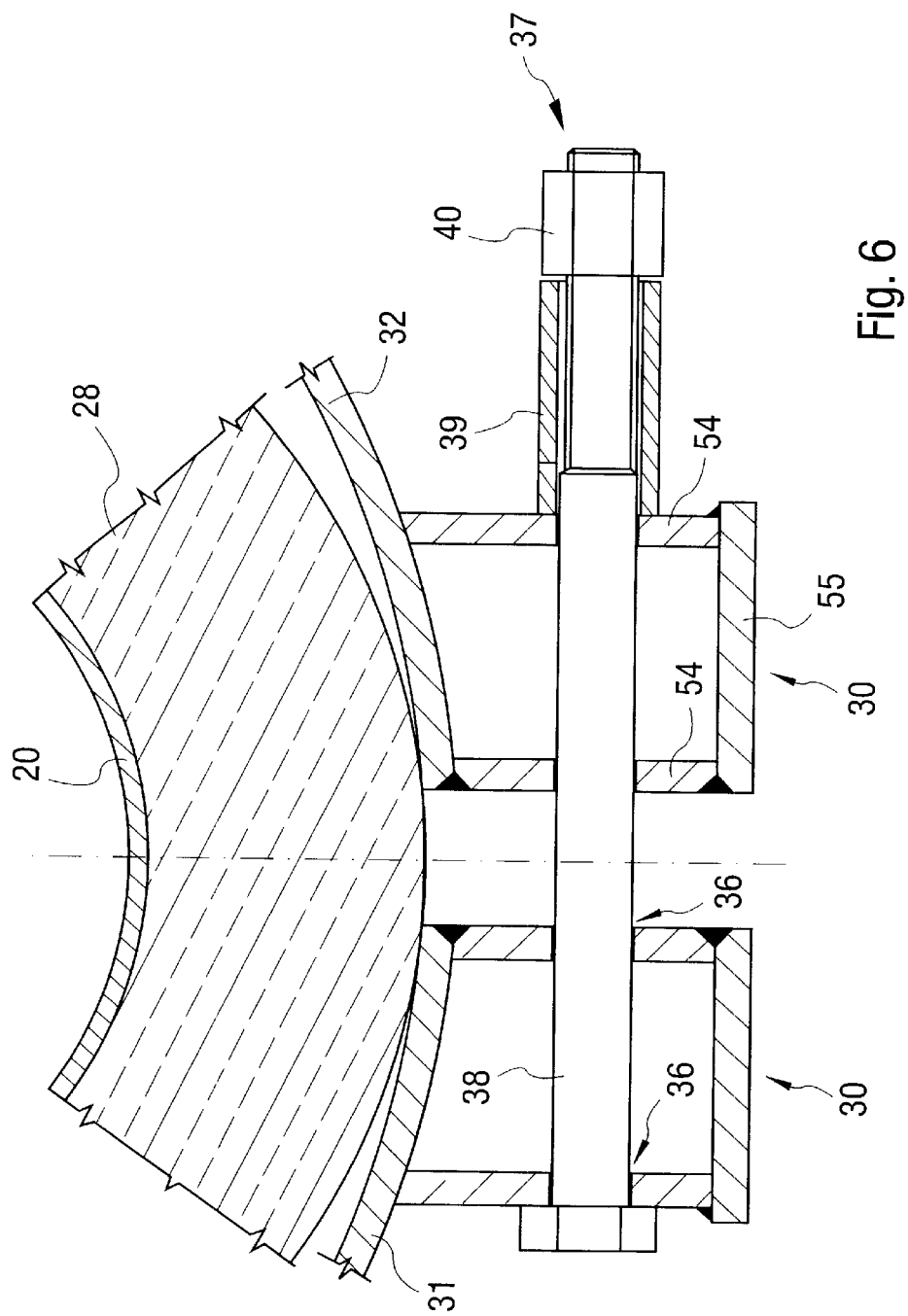
FIG. 6 is a detail of the support according to FIG. 5 in the partially supported state.

As is apparent from FIGS. 4 and 6, the following procedure is followed during the mounting of the support. The insulating shell 28, which is formed by two insulating half shells 41 and 42 in this case, is first placed on the pipeline 20. The insulating shell 28 is then jacketed with a vapor barrier 43 of its own, and the vapor barrier 43 is welded to an overlapping area 44 and then folded over (FIG. 11). The vapor barrier 43 is then jacketed with a protective jacket 45 consisting of a thin steel plate, which acts as a mechanical protection. As can be determined from FIG. 12, this protective jacket 45 is made somewhat narrower than the vapor barrier 43 and the insulating shells 41, 42. The vapor barrier 24 of the adjoining insulation 21 of the pipeline 20 is placed, namely bonded or welded later to the projecting area of the vapor barrier 43.

The carriage parts 31, 32 are subsequently placed on the base plate 26 on the left and right next to the pipeline 20 and pushed together from the side approximately into the position shown in FIGS. 3 and 6 (see also FIGS. 4 and 7, center). The flanges 34 are spaced from each other by a pre-assemble distance as also shown in FIGS. 3 and 6. The guide tools 37 are then inserted into the guide holes 36 and the carriage parts 31, 32 are gradually brought together until they reach their end position (FIGS. 4 and 6, bottom) by alternatingly screwing the tools. Finally, the carriage parts 31, 32 are also bolted together by means of three bolts 46 each per connection flange 33, 34. The connection flanges 33, 34 have three holes 47 each for this purpose.

The support is disassembled in the reverse order. All parts can be removed undamaged, so that they can be reused for repeated supporting. Thus, it is possible, in particular, to remove the carriage, which may have been corroded, it can be sandblasted, provided with a corrosion protection and subsequently supported again in the above-described manner. However, new mounting of supports can also be carried out simply in the above-described manner.

Figure 15:
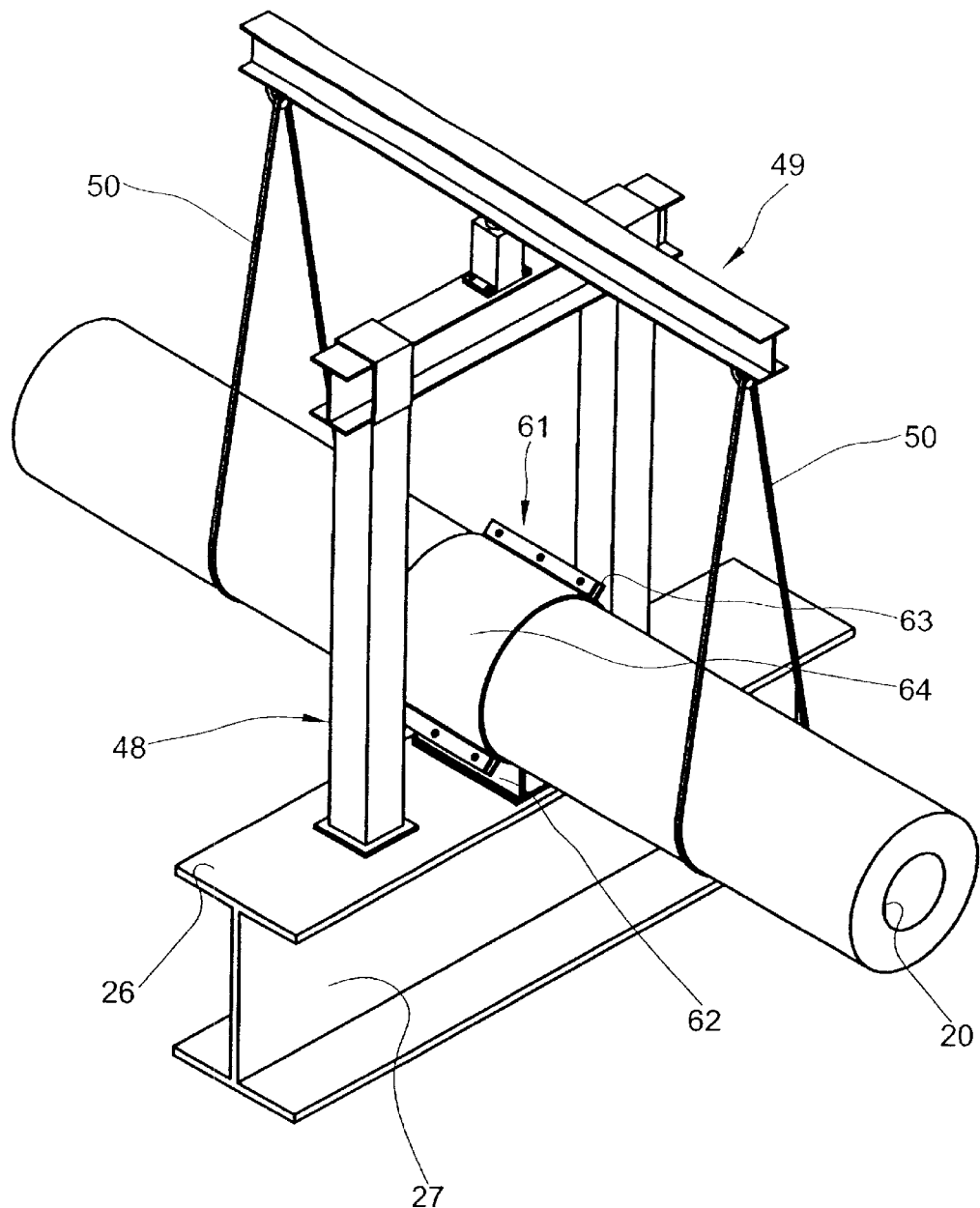
FIG. 15 is a perspective view of an auxiliary device for mounting and removing a support.

An auxiliary support, which is shown in greater detail in FIG. 15, is shown for the temporary supporting of the pipeline 20 during the mounting and disassembly. FIG. 15 still shows the auxiliary support with a support according to the state of the art, which shall be replaced with a support according to the present invention for the temporary supporting of the pipeline 20 during the mounting and disassembly.

The auxiliary support has an auxiliary frame 48, which is placed over the pipeline 20 on the pipeline carrier 27, namely, the base plate 26. The auxiliary frame 48 now bridges over the pipeline 20. A gallows 49, which is arranged in the longitudinal direction of the pipeline 20 and projects over the auxiliary frame 48 on both sides, is arranged on the auxiliary frame 48. Two carrying loops 50 each, in which the pipeline 20 is suspended, are fastened at the two ends of the auxiliary frame and on the gallows 49. The carrying loop 50 may consist of a cable or chain, which is recommended, however, only if it is placed directly on the pipeline 20 itself Should the carrying loop 50 be laid over the insulation 21 of the pipeline 20, it is recommended that a broad belt be used as the carrying loop 50.

The support according to the state of the art, which is shown in FIG. 15, is now removed by cutting apart and removing the carriage 29. The insulating shells are subsequently also destroyed in the area of the support and disposed of. The maintenance and inspection procedures necessary in this area can then be performed. Finally, the new support according to the present invention is mounted in the above-described manner and the auxiliary frame 48 is removed.

Figure 2:
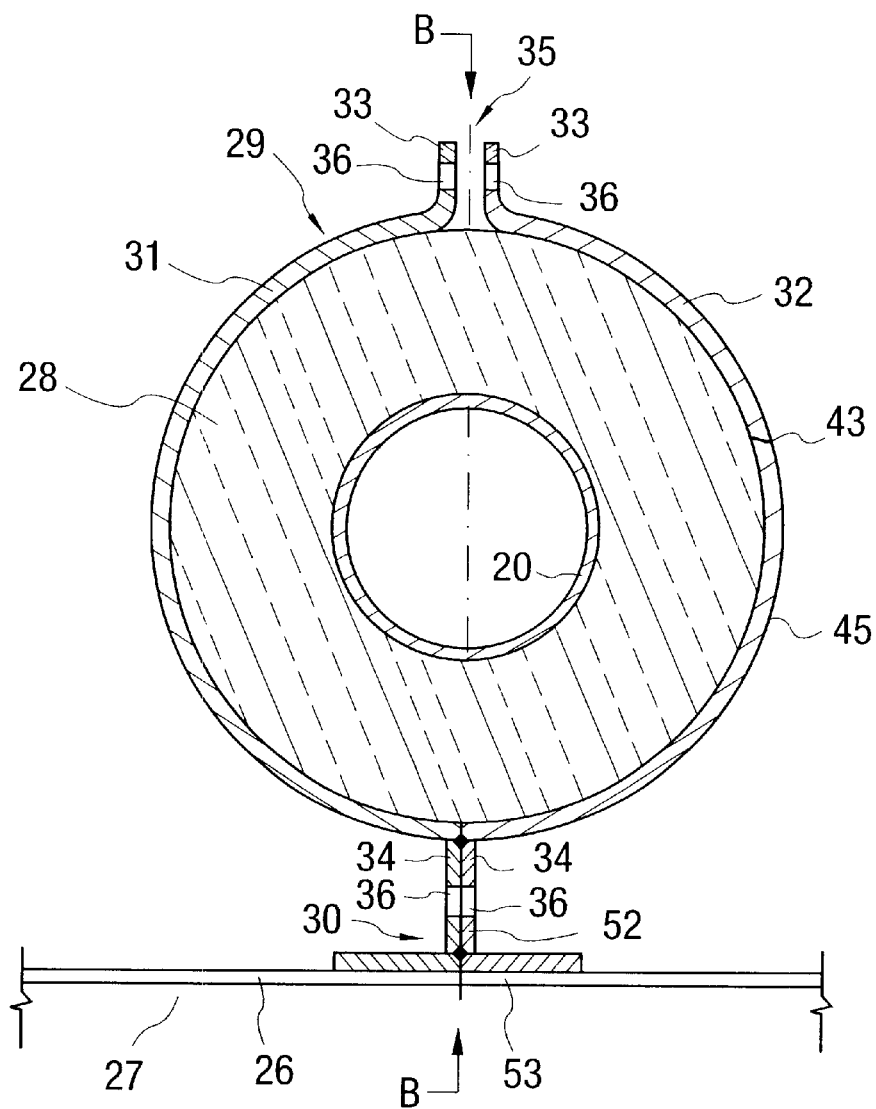
FIG. 2 is a cross sectional view of the support according to FIG. 1 in plane A—A.
Figure 5:
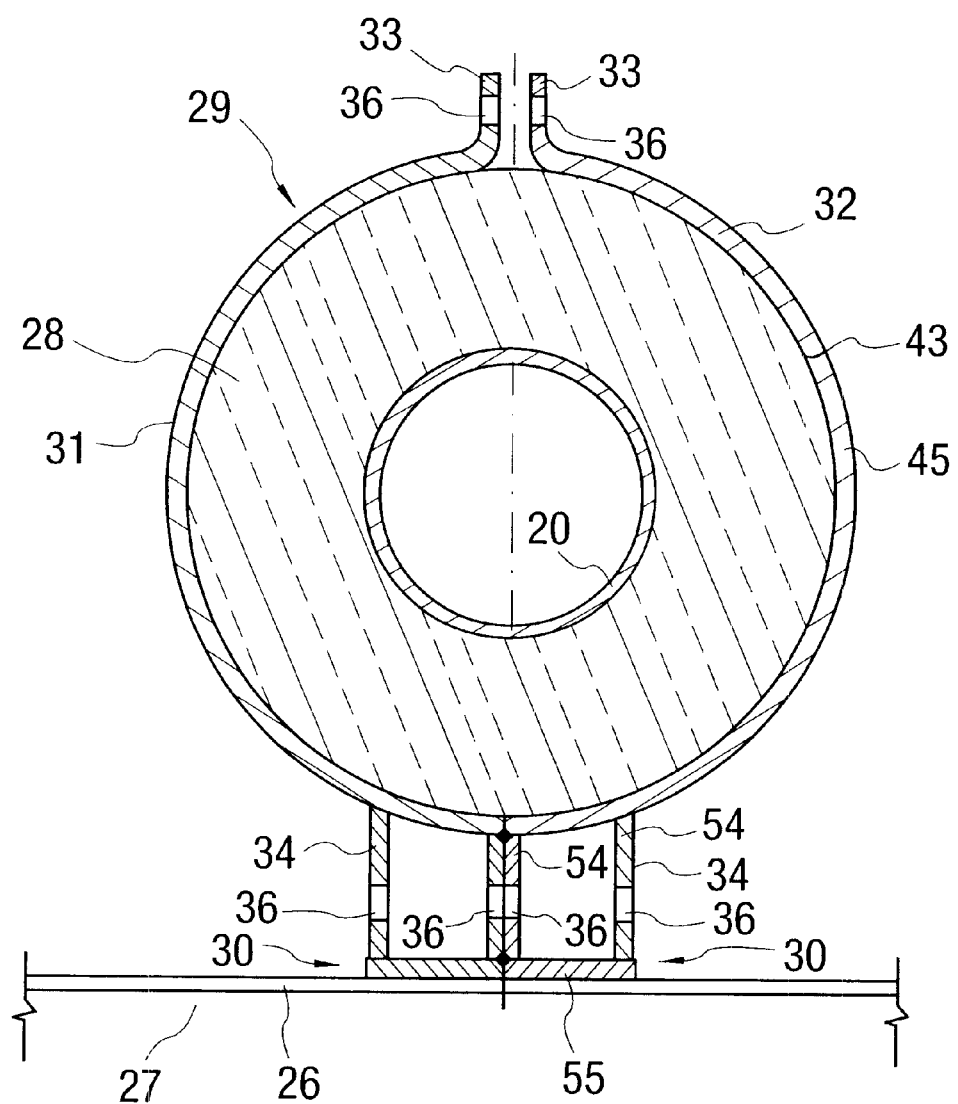
FIG. 5 is in a cross sectional view taken along a plane analogous to plane A—A in FIG. 1 showing another exemplary embodiment for a support with the features of the present invention.
Figure 7A:
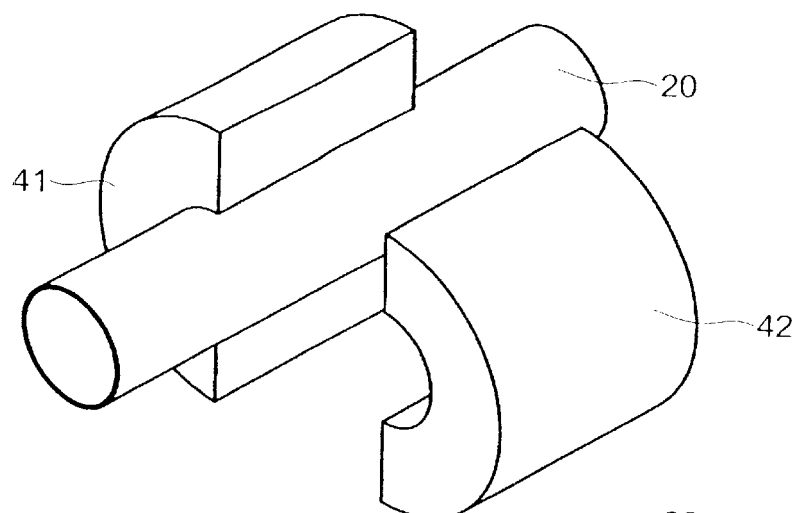
FIG. 7A is a in a schematic perspective view showing a step of a process for mounting the support according to FIG. 5.
Figure 7B:
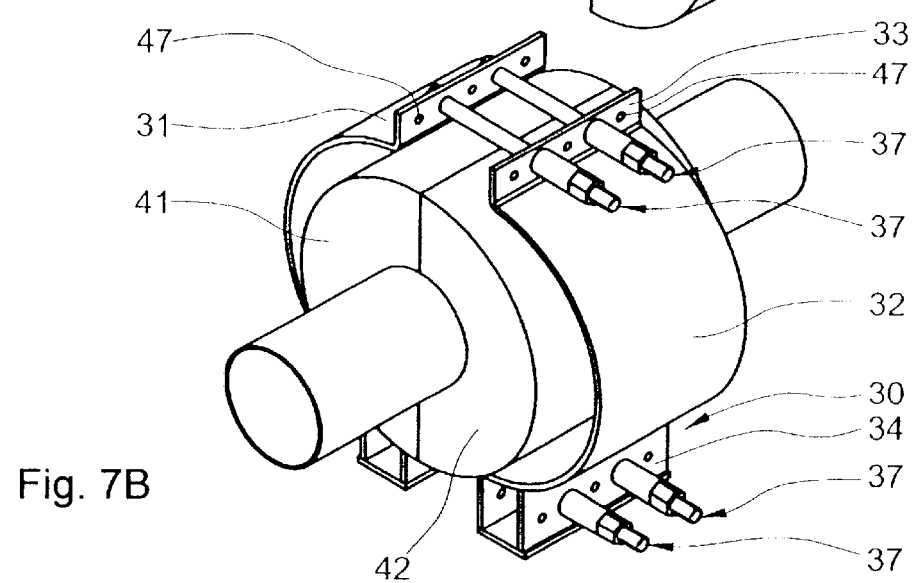
FIG. 7B is a in a schematic perspective view showing another step of a process for mounting the support according to FIG. 5.
Figure 7C:
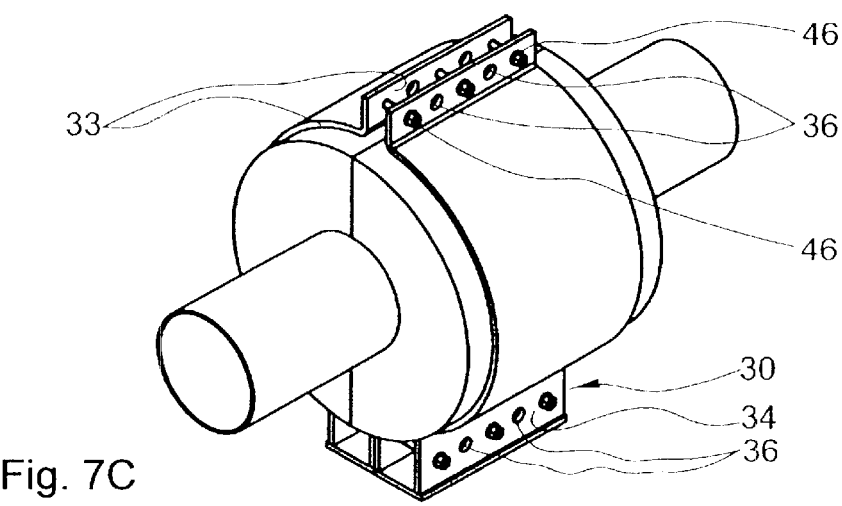
FIG. 7C is a in a schematic perspective view showing another step of a process for mounting the support according to FIG. 5.

FIGS. 2 through 4 as well as FIGS. 5 through 7 show two exemplary embodiments of carriages 29, but these carriages 29 are identical to one another in their essential points. Only the feet 30 are designed differently. The feet are essentially of an L-shaped design with vertical webs 52 and horizontal bottoms 53 in the exemplary embodiment according to FIGS. 2 through 4A, B and C. The feet 30 in the exemplary embodiment according to FIGS. 5 through 7 have a U-shaped design, so that they form a box profile together with the lower shell area of the carriage parts 31, 32. Consequently, there are two upright webs 54 located at spaced locations from one another on a bottom 55.

Figure 8B:
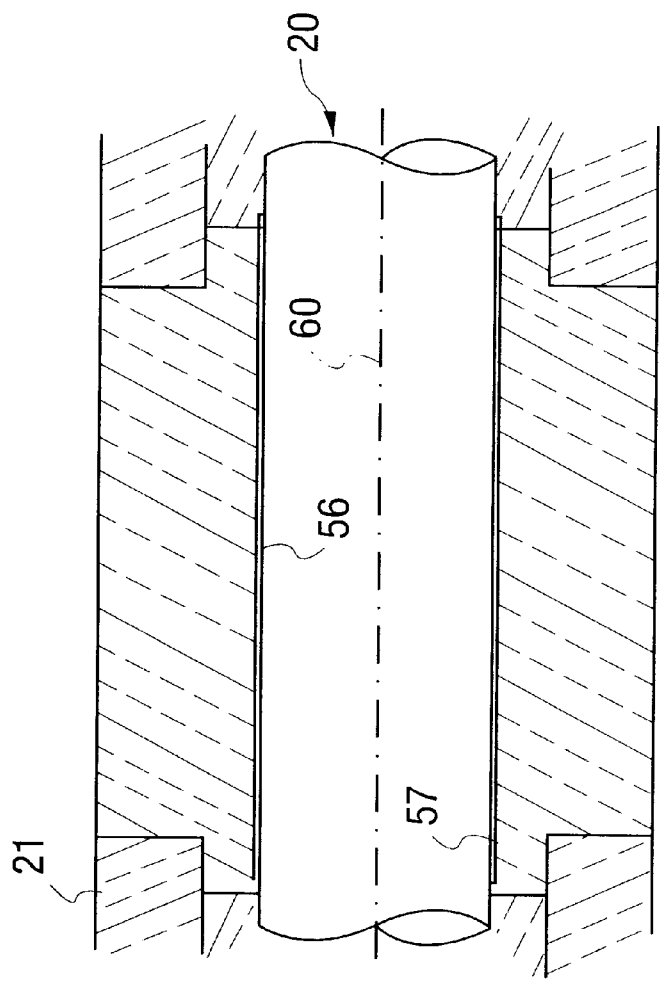
FIG. 8B is a side sectional view showing the first exemplary embodiment of an insulating shell for the support according to the present invention.
Figure 8A:
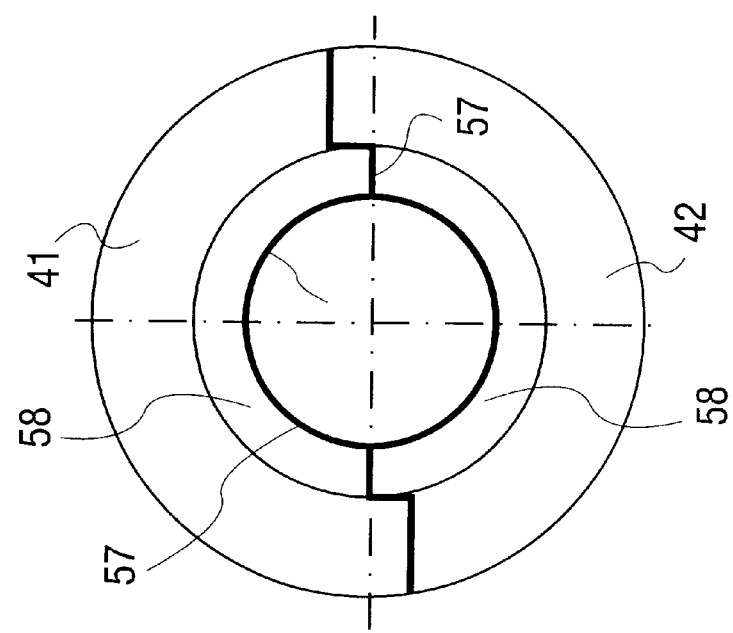
FIG. 8A is an end view showing a first exemplary embodiment of an insulating shell for the support according to the present invention.

Another aspect, which was not mentioned so far, should be taken into account in connection with the supporting of the insulating shell 28. Reference is made in this connection to FIGS. 8A and B. As soon as the insulating shell 28, namely, the insulating half shells 41, 42, has been placed on the pipeline 20, moisture can penetrate into the gap between the insulating shell 28 and the pipeline 20 and condense there. To prevent this from occurring, a sealing 57 consisting of a permanently elastic sealing compound is provided at least on the outer edge areas, i.e., at the front and rear face ends of the gap when viewed in the axial direction of the pipeline 20. Such sealing 57 is also provided between the insulating half shells 41, 42, so that they are completely tight. The permanently elastic sealing compound can be removed for the removal of the insulating half shells 41, 42 because of its permanent elasticity, so that the insulating half shells 41, 42 themselves remain undamaged and can be reused. FIGS. 9A, B, C, D and E also shows different exemplary embodiments, namely, geometric configurations for the insulating half shells 41, 42. The exemplary embodiment shown in FIG. 9A, which is also shown in greater detail in FIG. 10, is a cylindrical jacket cut out in the central longitudinal plane. The exemplary embodiment shown in FIG. 9B, which is also shown in FIGS. 8A and 8B, is stepped, and a step-like projection 58 is also provided on the front sides. The exemplary embodiment shown in FIG. 9C shows a tongue-and-groove arrangement, and the front sides also have the step-like projection 58. However, it is common to all exemplary embodiments that the insulating shells 41, 42 have the same design, so that they can be fitted together by simple rotation against one another.

Figure 13:
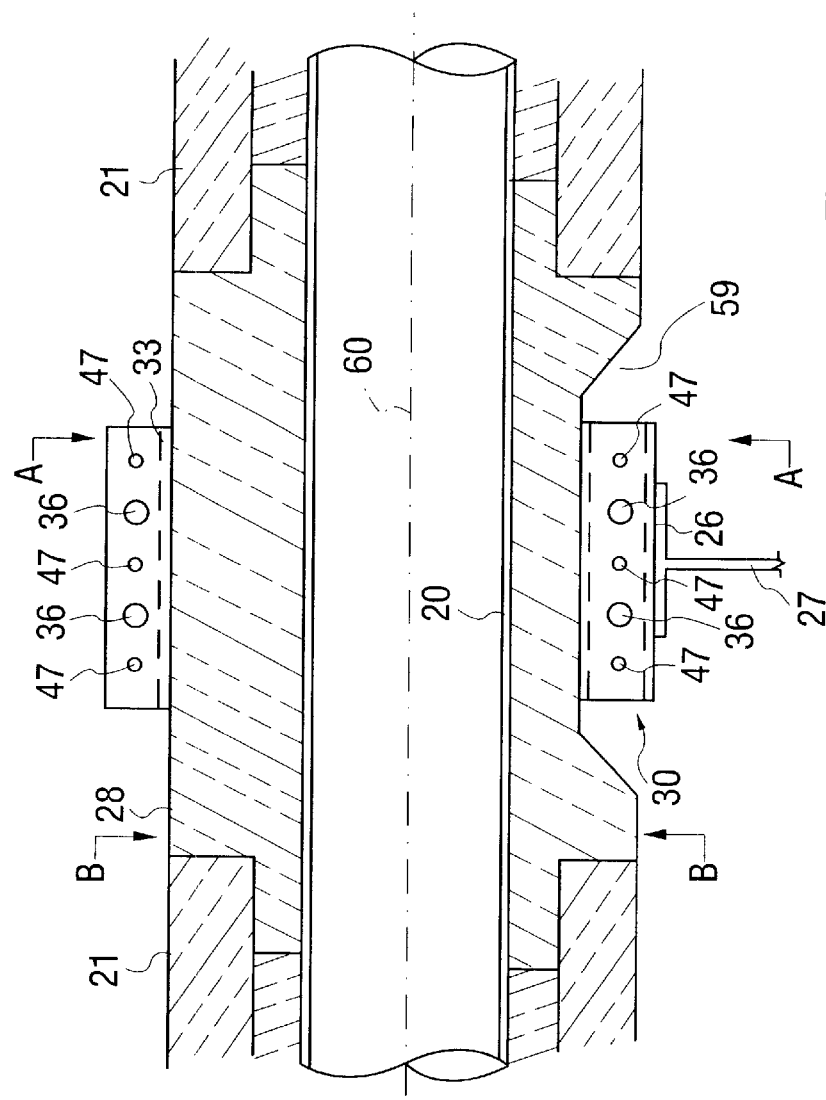
FIG. 13 is in a longitudinal sectional view of another exemplary embodiment of a support with the features of the present invention.
Figure 14:
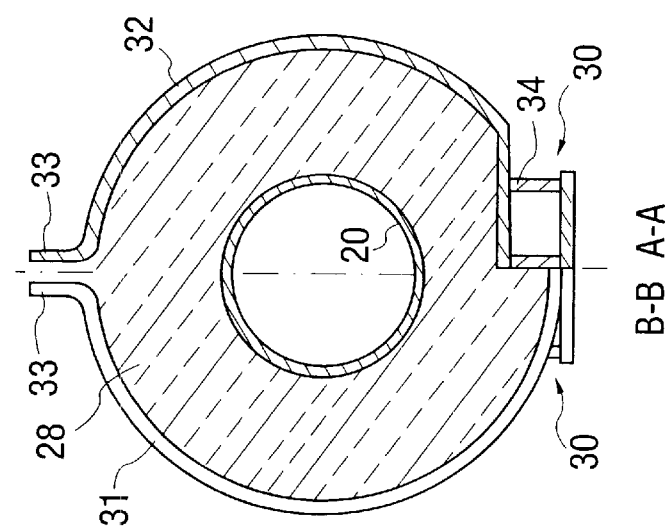
FIG. 14 is a cross sectional view of the support according to FIG. 13 in planes A—A and B—B.

A peculiarity is also shown in FIGS. 13 and 14. The distance between the pipeline 20 and the pipeline carrier 27 or its base plate 26 is so small in some plants that it corresponds to the thickness of the insulation 21. This distance is sometimes even smaller. To make it nevertheless possible to accommodate the support according to the present invention, the insulating shell 28 is flattened, e.g., by milling on its lower area facing the pipeline carrier 27. A recess 59, which accommodates the foot 30 of the carriage 29, is formed as a result in the insulating shell 28. The insulation 21 is weakened in this area, which is knowingly accepted. It can be accepted in light of the markedly improved possibility of maintenance on the carriage 29.

In the exemplary embodiments shown above, the insulating half shells 41, 42 are put in place separately before the carrier 29 is arranged on the pipeline 20. However, it is also conceivable to arrange the insulating half shells 41, 42 firmly on the carriage parts 31, 32. It is recommended that the insulating shells 41, 42 be bonded to the carriage parts 31, 32 by means of a permanently elastic sealing compound, so that no moisture can penetrate there. Sealing compound is then also provided in the same manner between the connection flanges 33, 34. The vapor barrier 24 of the insulation 21 must then be placed directly on the carriage parts 31, 32. It is obvious that this is more difficult, so that the supporting process shown in the drawings is consequently preferred.

While specific embodiments of the invention have been shown and described in detail to illustrate the application of the principles of the invention, it will be understood that the invention may be embodied otherwise without departing from such principles.

APPENDIX

List of Reference Numbers

20 Pipeline
21 Insulation
22 Insulation layer
23 Insulation layer
24 Vapor barrier
25 Protective jacket
26 Base plate
27 Pipeline carrier
28 Insulating shell
29 Carriage
30 Foot
31 Carriage part
32 Carriage part
33 Connection flange
34 Connection flange
35 Plane of division
36 Guide hole
37 Guide tool
38 Bolt
39 Spacer sleeve
40 Nut
41 Insulating half shell
42 Insulating half shell
43 Vapor barrier
44 Overlapping area
45 Protective jacket
46 Bolt connection
47 Hole
48 Auxiliary frame
49 Gallows
50 Carrying loop
51 Datum level
52 Web
53 Bottom
54 Web
55 Bottom
56 Gap
57 Sealing
58 Projection
59 Recess
60 Central axis of pipeline
61 Carriage
62 Foot
63 Shell
64 Shell

What is claimed is:

1. A support for pipelines for cold liquids:

an insulating shell surrounding the pipeline;

a carriage surrounding said insulating shell, said carriage including two parts, each of said parts having connection flanges, said two parts being connected to one another at said connection flanges by means of connection bolts received in holes arranged in the connection flanges, one of said connection flanges being arranged exactly under said pipeline when viewing vertically toward a central axis of the pipeline from a base plate on which the pipeline is supported, said carriage parts having guides, said guides are a plurality of separate guide holes associated with each said connection flange; and guide tools received in said guides.

2. A support in accordance with claim 1, wherein said guide tools have bolts with spacer sleeves and nuts such that said carriage parts are guided by means of said guide holes on a barrel of the bolts.

3. A support in accordance with claim 1, wherein:

said guide tool includes a nut, said guide bolt has a threaded portion threadable into said nut.

4. A support in accordance with claim 3, wherein:

said guide tool includes a spacer positionable around said threaded portion and between one of said flanges and said nut;

said nut being rotatable on said bolt to push said spacer against said one flange.

5. A support in accordance with claim 1, wherein:

said guide tool includes a bolt with a barrel, said barrel having a length longer than a thickness of adjacent said flanges.

6. A process for mounting a support on a pipeline for cold liquids, the support having a two-part or more than two-part carriage surrounding an insulating shell surrounding the pipeline, the carriage comprising the carriage parts connected to one another at connection flanges, the process comprising;

placing the carriage parts laterally next to the pipeline surrounded by the insulating shell;

bringing the carriage parts to the pipeline insulating shell using guide tools wherein the carriage parts are gradually brought together to their end position by alternatingly screwing the guide tools; and connecting the carriage parts to one another with separate fasteners.

7. A process in accordance with claim 6, wherein the insulating shell is first supported on the pipeline and the carriage is then put in place.

8. A process in accordance with claim 7, wherein said insulating shell is formed of insulating shell parts associated with the carriage parts, said insulating shell parts being supported together with said carriage parts.

9. Process in accordance with claim 7, wherein a gap between the insulating shell and the pipeline is closed by providing a sealing including a permanently elastic sealing compound.

10. A process in accordance with claim 6, wherein said insulating shell is formed of insulating shell associated with the carriage parts, said insulating shell being supported together with said carriage parts.

11. Process in accordance with claim 6, wherein a gap between the insulating shell and the pipeline is closed by providing a sealing including a permanently elastic sealing compound.

12. A process in accordance with claim 6, wherein the pipeline is carried by an auxiliary support during a mounting and/or removal thereof.

13. A process for mounting a support on a pipeline, the process comprising the steps of:

providing a carrier spaced from the pipeline;

providing first and second and carriage parts, each of said carriage parts having a flange, each said flange defining a guide hole and a fastening hole;

placing said carriage parts on opposite sides of the pipeline with said flanges adjacent said carrier, said flanges being spaced from each other by a pre-assembly distance;

providing a guide tool having a length longer than said pre-assembly distance;

inserting said guide tool into said guide holes of said flanges separated by said pre-assemble distance; contracting said guide tool to bring said flanges toward each other;

providing a fastener having a length less than said pre-assemble distance;

inserting said fastener through said fastening holes of said flanges;

fastening said flanges together with said fastener;

removing said guide tool from said flanges.

14. A process in accordance with claim 13, wherein:

said guide tool includes a bolt with a barrel, said barrel having a length longer than said pre-assemble distance.

15. A process in accordance with claim 14, wherein:

said guide tool includes a nut, said bolt has a threaded portion threadable into said nut.

16. A process in accordance with claim 15, wherein:

said guide tool includes a spacer positionable around said threaded portion and between one of said flanges and said nut;

said contracting of said guide tool includes rotating said nut on said bolt to push said spacer against said one flange.

17. A process in accordance with claim 13, wherein:

said fastener has a fastening length less than said pre-assemble distance;

said guide tool includes a bolt with a barrel, said barrel having a length longer than said pre-assemble distance.

18. A process in accordance with claim 17, wherein:

said fastener can only fasten objects spaced less than or equal to said fastening length.

19. A process in accordance with claim 13, wherein:

said contracting and said fastening are performed to position said flanges substantially perpendicular to said carrier and support the pipeline;

thermal insulation is positioned between the pipeline and the carriage parts.

* * * * *